United States Patent
Priola (10) Patent No.: US 12,366,324 B2
(45) Date of Patent: Jul. 22, 2025

(54) PIVOT STRUCTURE FOR ADJUSTABLY SUSPENDING EQUIPMENT FROM A CEILING TRACK

(71) Applicant: AIRWALL HANGERS CORPORATION, San Diego, CA (US)

(72) Inventor: James W. Priola, San Clemente, CA (US)

(73) Assignee: Airwall Hangers Corporation

( * ) Notice: Subject to any disclaimer, the term of this patent is extended or adjusted under 35 U.S.C. 154(b) by 0 days.

(21) Appl. No.: 18/369,124

(22) Filed: Sep. 15, 2023

(65) Prior Publication Data

US 2024/0003487 A1 Jan. 4, 2024

Related U.S. Application Data

(63) Continuation of application No. 17/528,166, filed on Nov. 16, 2021, now abandoned, which is a continuation-in-part of application No. 16/440,892, filed on Jun. 13, 2019, now Pat. No. 11,174,986, which is a continuation-in-part of application No. 16/258,122, filed on Jan. 25, 2019, now Pat. No. 10,920,926.

(51) Int. Cl.
*F16M 13/02* (2006.01)
*A47B 97/00* (2006.01)
*G03B 21/56* (2006.01)

(52) U.S. Cl.
CPC ......... *F16M 13/027* (2013.01); *A47B 97/001* (2013.01); *G03B 21/56* (2013.01)

(58) Field of Classification Search
CPC .............. F16M 13/027; F16M 13/022; F16M 2200/021; F16M 2200/022; F16M 11/08; F16M 11/12; F16M 11/121; F16M 11/16; F16M 2200/02; F16M 2200/024; F16M 2200/025; F16M 2200/027; F16M 2200/028; E04B 2/82; G03B 21/56; E02F 3/3688; F02F 3/3672; F16B 2/18; F16B 2/185

See application file for complete search history.

(56) References Cited

U.S. PATENT DOCUMENTS

| | | | | |
|---|---|---|---|---|
| 1,055,398 | A | * 3/1913 | Horvath | F16C 23/02 403/374.3 |
| 2,758,675 | A | * 8/1956 | Callaway | B66B 1/52 187/389 |
| 3,784,145 | A | * 1/1974 | Lawrie | F16M 11/2085 248/580 |
| 3,814,023 | A | * 6/1974 | Stantial | A61G 12/004 105/154 |

(Continued)

*Primary Examiner* — Christopher Garft
(74) *Attorney, Agent, or Firm* — Charmasson, Buchaca & Leach, LLP (57) ABSTRACT

A pivot structure as part of a framework for temporarily suspending equipment such as a movie screen from a ceiling track can include an oblong beam adjustably mounted to the track. The pivot structure can include a housing having a cylindrical bearing for rotatively mounting a spindle. A pair of separately actuatable brakes can clamp the spindle in a locked position. Each brake can include a barrel having a concavity in its outer cylindrical surface which when driven against the spindle discourages its rotation.

11 Claims, 10 Drawing Sheets

(56) References Cited

U.S. PATENT DOCUMENTS

| | | | | |
|---|---|---|---|---|
| 5,165,647 | A * | 11/1992 | Ribeiro | F16M 13/027 248/323 |
| 7,316,380 | B2 * | 1/2008 | Arakawa | F16B 35/041 248/323 |
| 2003/0215284 | A1 * | 11/2003 | Wang | F16B 2/18 403/374.3 |
| 2014/0106940 | A1 * | 4/2014 | Zimmerman | A63B 69/222 482/86 |

* cited by examiner

PIVOT STRUCTURE FOR ADJUSTABLY SUSPENDING EQUIPMENT FROM A CEILING TRACK

PRIOR APPLICATION

This is a continuation of copending U.S. patent application Ser. No. 17/528,166 filed 2021 Nov. 16, which is a continuation-in-part of U.S. patent application Ser. No. 16/440,892, filed 2019 Jun. 13, now U.S. patent Ser. No. 11/174,986, issued 2021 Nov. 16, which is a continuation-in-part of U.S. patent application Ser. No. 16/258,122, filed 2019 Jan. 25, now U.S. patent Ser. No. 10/920,926, issued 2021 Feb. 16, both of which are incorporated herein by reference.

FIELD OF THE INVENTION

This invention relates to ceiling track fasteners and more specifically to devices used to suspend structures and equipment such as movie screens from tracks in ceilings, walls and other similar structural surfaces.

BACKGROUND

Arranging a site for a spectacle, meeting or other gathering requires the temporary installation of a large amount of equipment and other structures. Often, space and setup time are limited. The ceilings of meeting rooms, convention centers, civic centers, classrooms, banquet facilities, conference centers, lecture halls, hotel ballrooms, restaurants, and other public gathering facilities are often crisscrossed by tracks from which movable room dividers or curtain partitions are suspended.

Some items can be suspended from ceilings, beams or other overhead elements or attached to walls in a very secure, but also quickly adjustable manner. This frees up floor space for additional seating so that capacities and thus revenue for a given room can be increased. For example, lighting apparatuses for a stage, loudspeakers, cabling, props and curtain walls for subdividing a large meeting hall are often suspended from the rails of tracks, typically made of steel or aluminum, which are affixed to the ceiling or other overhead structure. Adjustable, slot-engaging fastening hangers, such as disclosed in Kleege, U.S. Pat. No. 7,958,684, incorporated herein by reference, which pass through the slot between the rails of the track are commonly used for suspending the overhead equipment from the track. These brackets allow the location of suspension to be adjusted along the course of the track.

A typical piece of equipment used in meeting rooms is one or more reflective movie screens or large computer or television monitor screens. The screens are often mounted upon stands which rest upon the floor. In order to maintain adequate stability such stands often have legs, or widened bases which extend outwardly from the stand, taking up valuable floor space. In addition, the extended legs or bases can create a tripping hazard and are susceptible to damage. Other items which use stands are lighting equipment, loudspeakers and other audio reinforcement equipment.

Sometimes video screens can be mounted to walls using specialized mounting brackets that can be expensive, unique to a specific type of video screen, and require special skill at mounting properly. Often movable walls or curtains do not provide adequate support for such mounting brackets.

Therefore, there is a need for improved mounting of movie screens and video monitoring equipment which addresses some or all of the above identified inadequacies.

SUMMARY

The principal and secondary objects of the invention are to provide an improved video screen mounting device. These and other objects are achieved by a hand-manipulable, track-engaging, swiveling, adjustable screen mounting framework.

In some embodiments there is provided a pivot structure which comprises: a housing comprising a bearing; a spindle being rotatable within said bearing about a spindle axis; a first brake comprising a first concavity contacting said spindle to discourage rotation of said spindle when said first brake is in a first locked position; and, a first mechanism for releasably driving the first concavity against the spindle.

In some embodiments said first brake further comprises: a substantially cylindrical first barrel wherein said first concavity is set into a side surface of said first barrel.

In some embodiments said first brake further comprises: a first jackscrew engaging a threaded bore in said first barrel.

In some embodiments said first brake further comprises: said first barrel slidingly engaging a first cylindrical bore in said housing.

In some embodiments said first brake further comprises: said first cylindrical bore extending along a first axis; and, wherein said first axis is substantially perpendicular to said spindle axis.

In some embodiments the pivot structure further comprises: a second brake comprising a second concavity contacting said spindle to discourage rotation of said spindle when said second brake is in a second locked position; and, a second mechanism for releasably driving the second concavity against the spindle.

In some embodiments the pivot structure further comprises: a substantially cylindrical second barrel wherein said second concavity is set into a side surface of said second barrel; a second jackscrew engaging a threaded bore in said second barrel; said second barrel slidingly engaging a second cylindrical bore in said housing; said second cylindrical bore extending along a second axis; and, wherein said second axis is substantially perpendicular to said spindle axis.

In some embodiments the pivot structure further comprises: said first axis and said second axis being substantially parallel.

In some embodiments the pivot structure further comprises: a second brake comprising a second concavity contacting said spindle to discourage rotation of said spindle when said second brake is in a second locked position; and, a second mechanism for releasably driving the second concavity against the spindle.

In some embodiments there is provided a combination of a ceiling track and an adjustable framework: wherein said ceiling track comprises a pair of inwardly extending substantially parallel rails separated by a slot having a given slot width; wherein said adjustable framework comprises: a beam including a first end and a second end; a first hanger located proximate said first end for suspending said beam from said track; a second hanger located proximate said second end for suspending said beam from said track; wherein at least one of said first and second hangers is adjustable along a vertical direction; a pivot secured to a medial part of said beam, said pivot comprises: a housing; a spindle rotatively mounted to said housing, and having a first axis of rotation substantially parallel to said vertical direction; a clamp releasably locking the angular position of said spindle in said housing; a boom secured to said housing; a first cradle secured to said boom; and, a second cradle secured to said boom.

In some embodiments each of said cradles comprises a hook for engaging an oblong member perpendicular to said axis of rotation.

In some embodiments each of said cradles further comprise a cradle lock for releasably securing said member within said hook.

In some embodiments said clamp comprises: said spindle intimately and rotatively engaging a bearing in said housing; said bearing having a substantially cylindrical sidewall; a pair of brakes bearing against said spindle; wherein a first one of said brakes comprises: a first concavity contacting said spindle to discourage rotation of said spindle when said first one of said brakes is in a first locked position; and, a first mechanism for releasably driving the first concavity against the spindle.

In some embodiments said boom comprises at least one level secured thereon.

In some embodiments said boom comprises a second pair of inwardly extending substantially parallel rails separated by a second slot having a given second slot width.

In some embodiments given second slot width is commensurate with said slot width.

In some embodiments there is provided a method for suspending a screen from a ceiling track, said method comprises: selecting a framework which comprises an oblong beam having opposite ends, a pivot secured to a middle part of said beam, a boom secured to said pivot, and a pair of cradles secured to said boom; engaging said opposite ends to said ceiling track; adjusting a distance between at least one of said opposite ends and said track, thereby leveling said beam; hanging a screen from said pair of cradles; rotating said boom with respect to said beam about said pivot, thereby adjusting an angle of said screen with respect to said track; and, locking said pivot, thereby releasably preventing further angular movement of said screen with respect to said ceiling track.

In some embodiments said leveling comprises: repeatedly observing a level affixed to said boom while said adjusting is undertaken.

In some embodiments there is provided a joint structure for adjustably hanging items beneath a track, said structure comprises: a housing; a collar secured to said housing, said collar including a substantially cylindrical well; a substantially cylindrical axle rotatively engaging said well about a first axis of rotation; wherein said axle comprises a circumferential groove; a cam drive engaging said groove and moving said axle axially between an upper locked position and a lower unlocked position; wherein a surface of said collar bears against said track when said axle in said upper locked position; and, wherein said axle is rotatively fixed with respect to said housing when said axle in said upper locked position.

In some embodiments said cam drive comprises: a pair of coaxial cam units penetrating said housing on opposite sides of said axle; wherein each of said cam units comprise a cam shaft and cam pin engaging an off-axis pit in said cam shaft.

In some embodiments said joint structure further comprises: a spindle rotatively mounted to said housing; said spindle having a second axis of rotation substantially perpendicular to said first axis of rotation.

In some embodiments said joint structure further comprises: a track-engaging head attached to said axle; an axially sliding engagement between said track-engaging head and said axle.

In some embodiments said joint structure further comprises: said head having an angularly keyed prominence; said axle having a top angularly keyed receptacle intimately engaged by said angularly keyed prominence; a springed fastener mechanically attaching said head to said axle and biasing said axially sliding engagement.

In some embodiments there is provided the combination of a ceiling track and an adjustable framework: wherein said ceiling track comprises a pair of inwardly extending substantially parallel rails separated by a slot having a given slot width; wherein said adjustable framework comprises: a beam including a first end and a second end; a first hanger located proximate said first end for suspending said beam from said track; a second hanger located proximate said second end for suspending said beam from said track; wherein at least one of said first and second hangers is adjustable along a vertical direction; a pivot secured to a medial part of said beam, said pivot comprises: a housing; a spindle rotatively mounted to said housing, and having a first axis of rotation substantially parallel to said vertical direction; a clamp releasably locking the angular position of said spindle in said housing; a first boom extending canteleveredly from said housing; a second boom extending canteleveredly from said housing; a first locking cradle secured to said first boom; and, a second locking cradle secured to said second boom.

In some embodiments said first and second booms are elongated along coaxial axes.

In some embodiments each of said cradles comprises a hook for engaging an oblong member perpendicular to said axis of rotation.

In some embodiments each of said cradles further comprise a cradle lock for releasably securing said member within said hook.

In some embodiments said clamp comprises: said spindle intimately and rotatively engaging a bearing in said housing; said bearing having a substantially cylindrical sidewall; a pair of arcuate chock jaws engaged by a jackscrew; said chock jaws contacting said spindle through an aperture in a said substantially cylindrical sidewall; and, whereby rotation of said jackscrew causes relative movement of said jaws.

In some embodiments said beam comprises at least one level secured proximate to one of said ends.

In some embodiments at least one of said booms comprises a second pair of inwardly extending substantially parallel rails separated by a second slot having a given second slot width.

In some embodiments said given second slot width is commensurate with said slot width.

In some embodiments said pivot is a first pivot, and wherein said combination further comprises a second pivot interposed between said first pivot and said booms so that a second axis of rotation of said second pivot is mutually substantially orthogonal to said first axis of rotation.

In some embodiments there is provided a method for suspending a screen from a ceiling track, said method comprises: selecting a framework which comprises an oblong beam having opposite ends, a pivot secured to a middle part of said beam, a pair of cantelevered booms extending coaxially from opposite sides of said pivot, and a pair of cradles secured to said booms; engaging said opposite ends to said ceiling track; adjusting a distance between at least one of said opposite ends and said track, thereby leveling said beam; hanging a screen from said pair of cradles; rotating said booms with respect to said beam about said pivot, thereby adjusting an angle of said screen with respect to said track; and, locking said pivot, thereby releasably preventing further angular movement of said screen with respect to said ceiling track.

In some embodiments said leveling comprises: repeatedly observing a level affixed to said beam while said adjusting is undertaken.

The original text of the original claims is incorporated herein by reference as describing features in some embodiments.

DESCRIPTION OF THE EXEMPLARY EMBODIMENTS

Figure 1:
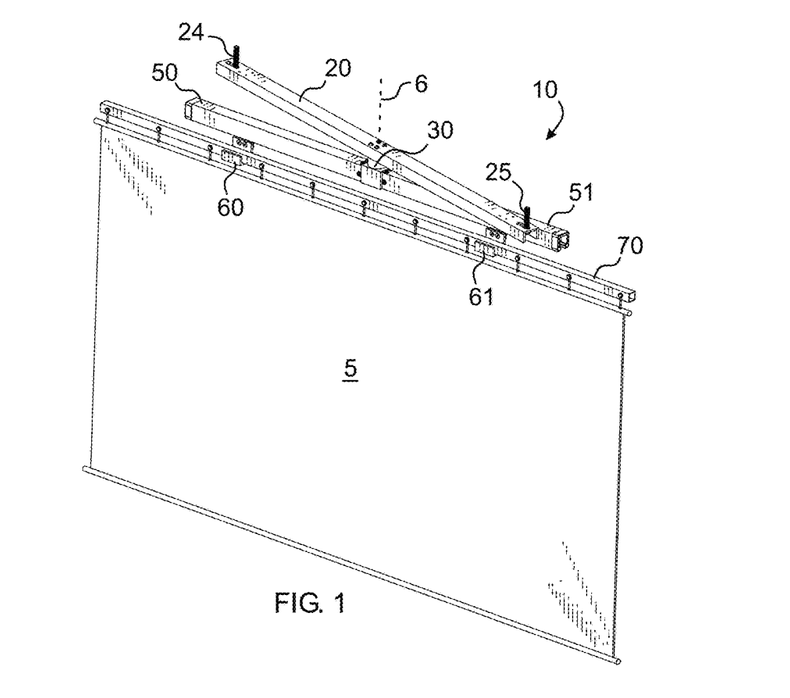
FIG. 1 is a diagrammatic perspective view of a hand-manipulable, track-engaging, swiveling, adjustable screen mounting framework according to an exemplary embodiment of the invention.
Figure 2:
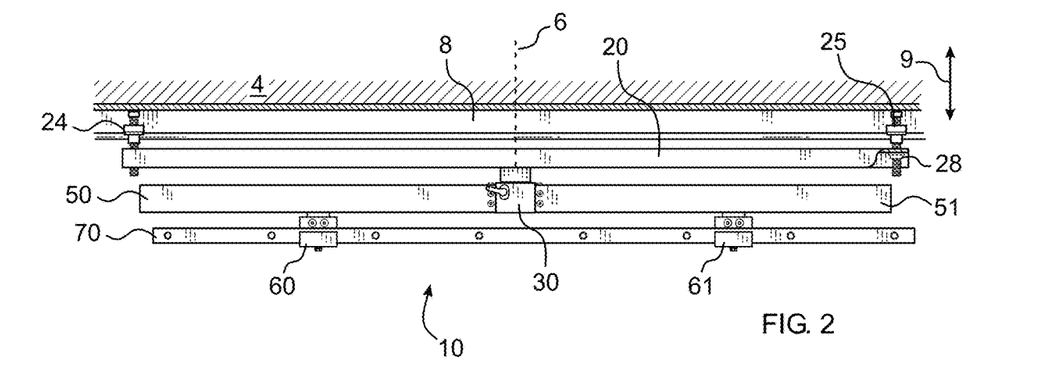
FIG. 2 is a diagrammatic partial cross-sectional side view of the framework of FIG. 1.

In this specification, the references to top, bottom, upward, downward, upper, lower, vertical, horizontal, sideways, lateral, back, front, etc. can be used to provide a clear frame of reference for the various structures with respect to other structures while the framework is suspended from above as shown in FIGS. 1 and 2, and not treated as absolutes when the frame of reference is changed, such as when the framework is laying on the ground or disassembled.

The term "substantially" can be used with respect to manufacturing imprecision and inaccuracies that can lead to non-symmetricity and other inexactitudes in the shape, dimensioning, orientation, and positioning of various structures. Further, use of "substantially" in connection with certain geometrical shapes and orientations, such as "parallel" and "perpendicular", can be given as a guide to generally describe the function of various structures, and to allow for slight departures from exact mathematical geometrical shapes, such as cylinders, disks and cones, and their orientations, while providing adequately similar function. Those skilled in the art will readily appreciate the degree to which a departure can be made from the mathematically exact geometrical references.

The word "axial" is meant to refer to directions, movement, or forces acting substantially parallel with or along a respective axis, and not to refer to rotational nor radial nor angular directions, movement or forces, nor torsional forces.

In this specification the units "millimeter" or "millimeters" can be abbreviated "mm", "centimeter" or "centimeters" can be abbreviated "cm".

Referring now to the drawing, there is shown in FIGS. 1 and 2 a hand-manipulable, track-engaging, swiveling, adjustable screen mounting framework 10 according to an exemplary embodiment of the invention. The framework can adjustably support a movie screen 5 or other item from an elongated track 8 secured to the underside of a ceiling 4. The framework can include a substantially horizontal beam 20 adjustably attached to the track by a pair of adjustable track-engaging hangers 24,25. The beam can support a locking pivot structure 30 which in turn can support a pair of cantilevered booms 50,51 extending from opposite sides of the pivot structure. The booms can support cradles 60,61 which in turn can support a spar 70 from which dangles the screen 5. The pivot structure allows the booms to rotate with respect to the beam about a rotation axis 6.

Figure 3:
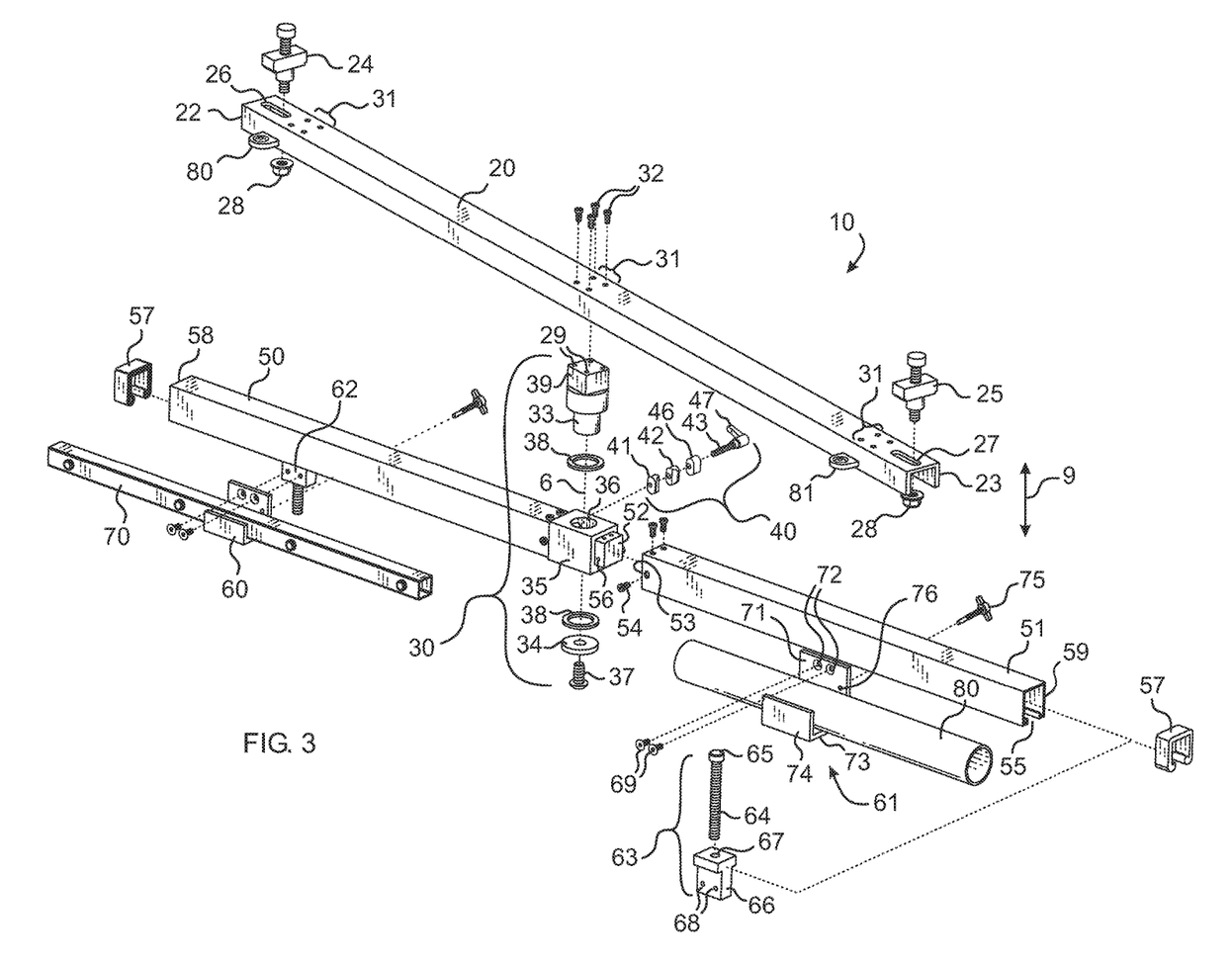
FIG. 3 is a diagrammatic exploded perspective view of the framework of FIG. 1.

FIG. 3 show the function of the framework 10 in greater detail. The framework 10 can include a substantially horizontal, oblong, rigid beam 21 having a pair of opposite ends 22,23. The beam can made steel or other durable, strong material. The beam can have a structural C-channel shape to provide strength and rigidity while reducing weight and material. A pair of adjustable, track engaging hangers 24,25 engage longitudinal oval slots 26,27 near each end of the beam, adjustably securing the beam to the track. When unlocked, the hangers can slide longitudinally within their respective slots, and slide longitudinally within the track. Each hanger can also be adjusted in the substantially vertical direction 9 by adjusting the nut 28 bearing against the underside of the beam below the oval slot. One or more levels 80,81, such as bubble levels, can mount upon the beam for conveniently providing ready feedback to technicians attempting to mount the framework in a level manner.

The beam 21 supports a locking pivot structure 30 which can mount using screw-type fasteners 32 to the undersurface of the beam at one of a number of seats 31 located in medial location between the hangers 24,25. The locking pivot structure can include a housing 35 having a substantially vertical cylindrical bearing 36 rotatively engaged by a spindle 33 having a substantially vertical axis of rotation 6. The spindle can be held axially engaged in the bearing by a lower retaining disk 34 fastened by a fastener 37. A pair of low-friction washers 38 made from a material such as ultra high molecular weight (UHMW) plastic allow smooth yet rugged rotation of the spindle within the bearing. A substantially quadrangular block 39 formed into the top of the spindle allows it to secure intimately and ruggedly to the underside of the beam 20 by screw-type fasteners engaging threaded holes 29 in the block.

The housing 35 of the locking pivot structure 30 can fixedly support a pair of cantilevered booms 50,51 extending from substantially opposite sides of the housing in a substantially coaxial manner. Each boom 50,51 can have a structural C-channel shape to provide strength and rigidity while reducing weight and material, and to create an underslot 55 similar to the ceiling track 8 which can be adjustably engaged by hangers as will be described below. Each boom 50 can connect to a tongue 52 protruding laterally from the housing 35 of the pivot structure 30. The tongue can be shaped and dimensioned to intimately engage the open end 53 of the boom. The boom can be secured upon the tongue using screw-type fasteners 54 engaging threaded holes 56 in the tongue. Protective end caps 57 fit onto the free ends 58,59 of the booms. The length of the booms can be selected so that they do not interfere with access from the bottom to the hangers hanging the beam as shown in FIG. 2. In this way when the booms and beam are in alignment, i.e. when their axes of elongation lie substantially within one plane, a technician can adjust one or both of the beam hangers in order to adjust their axial position within the track, or to change the vertical position of one or both of the beam ends.

Each of the booms 50,51 can support one or more cradles 60,61 which can attach to cradle hangers 62,63 which slidingly and lockably mount to the booms. Each cradle hanger 63 can include a threaded post 64 engaging a threaded bore 67 in a T-block 66. The threaded post can have a swiveling upper capital 65 for bearing against the inner upper surface of the boom when the hanger is locked in place. The T-block engages through the slot of a boom and bears from above against the inwardly projecting rails of the boom. A lower, exposed portion of the T-block has threaded holes 68 for fasteners 69 fastening a cradle or other structure thereon. Each cradle forms a generally hook shaped structure having a vertical plate portion 71 having fastening holes 72 for attaching the plate to the exposed portion of the T-block. A horizontal plate portion 73 extends substantially orthogonally from the bottom of the vertical plate portion terminating in a distal upwardly projecting rim portion 74 in order to form a hook for engaging an oblong member such as a lighting rig tube 80 resting in the cradle. A threaded lock pin 75 can engage through a threaded hole 76 in the vertical plate portion perpendicular to an axis of elongation of said oblong member to lock the member in the cradle. The oblong member is thus suspended in an orientation where the axis of elongation of the member is substantially perpendicular to the rotation axis 6 of the spindle 33.

The cradles can be in different shapes and sizes depending on their intended use. For example, a smaller cradle 60 can be used to support a spar 70 from which dangles the screen 5. A larger cradle 61 can be used to support lighting rig tubes 80, or other bulkier structures. Further, since the booms provide a similar function to a ceiling track, other hanger types and associated items can be readily supported by the adaptable framework.

Figure 4:
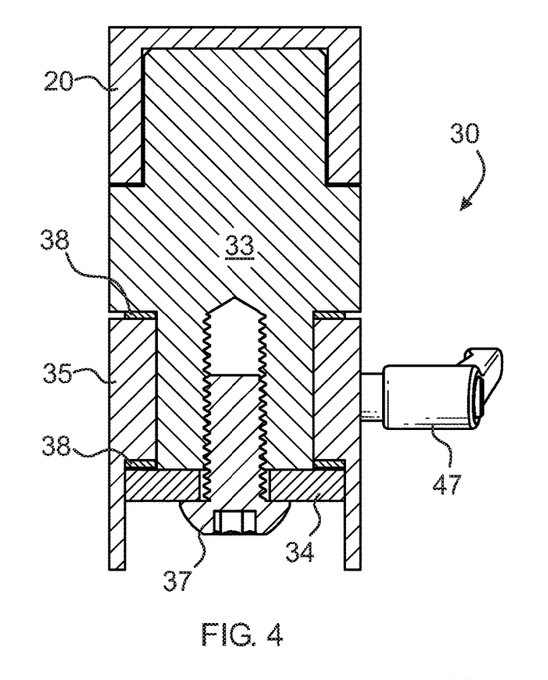
FIG. 4 is a diagrammatic partial cross-sectional side view of the pivot structure.
Figure 5:
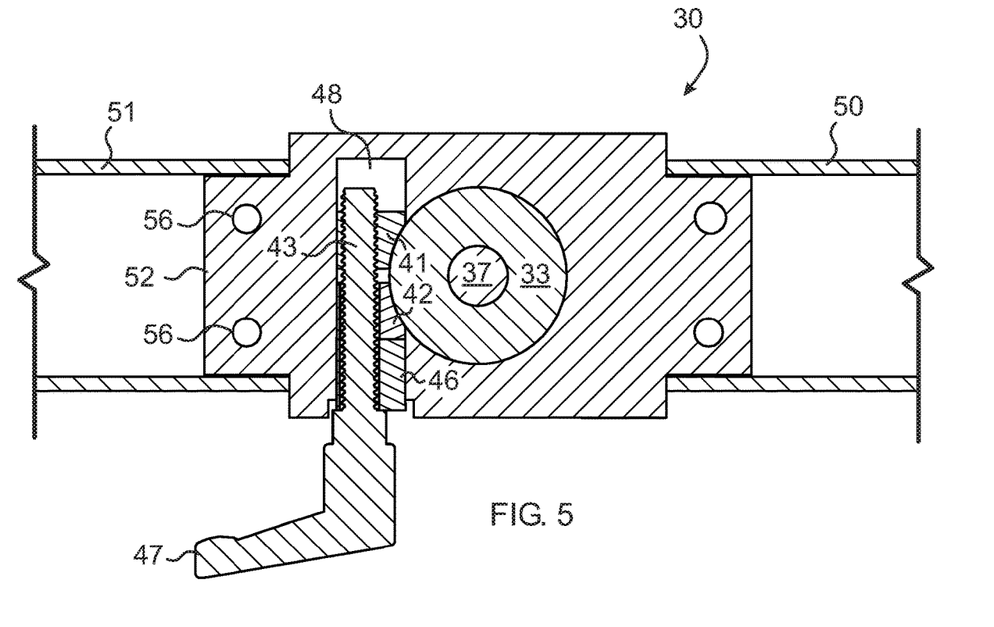
FIG. 5 is a diagrammatic cross-sectional top view of the pivot structure.

As shown in FIGS. 3-5, the angular position of the spindle 33 within the bearing 36 can be locked by a clamp 40. The clamp can include a pair of chock jaws 41,42 which can be driven together and apart by a jackscrew 43 engaging the threaded distal chock jaw 41 after passing through unthreaded apertures 44,45 in the proximal chock jaw 42 and a retaining plug 46. The chock jaws can move axially with respect to the jackscrew within a bearing channel 48 piercing through the housing 35 of the pivot structure 30. Both the chock jaws and the bearing channel can have an oval cross-section to allow axial movement while restrictive angular or other movement with respect to the housing. A handle 47 attached to the jackscrew allows ready manipulation of the clamp.

Figure 6:
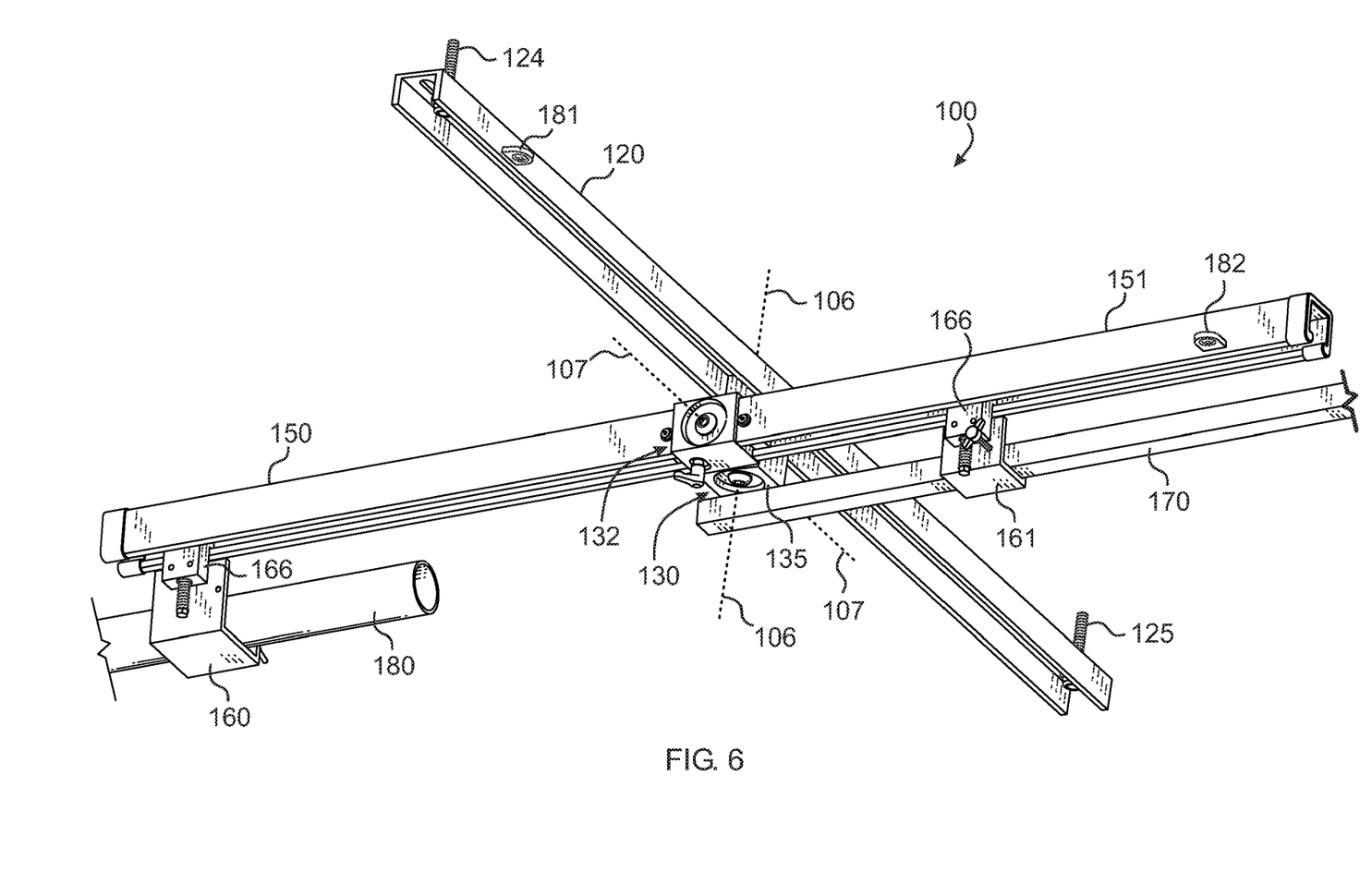
FIG. 6 is a diagrammatic perspective view of a framework according to an alternate exemplary embodiment having two mutually orthogonal pivot structures.

FIG. 6 shows the view from below of an alternate exemplary embodiment of a hand-manipulable, track-engaging, swiveling, adjustable screen mounting framework 100 which provides an additional degree of freedom through the use of a second pivot structure 132 having a second substantially horizontal rotational axis 107 which is substantially orthogonal to a rotational axis 106 of a first pivot structure 130 similar to the pivot structure of the embodiment of FIG. 1. In this embodiment the framework can include a substantially horizontal beam 120 adjustably attached to the track by a pair of adjustable track-engaging hangers 124,125. The beam can support a first locking pivot structure 130 which in turn can support a second locking pivot structure 132. The spindle (not shown) of the second pivot structure can attach to the housing 135 of the first pivot structure. The housing of the second pivot structure can support a pair of cantilevered booms 150,151 extending from opposite sides of the second pivot structure. Similar to the embodiment of FIG. 1, each boom can support a plurality of slidingly adjustable and lockable cradle hangers 166 which in turn can support differently sized cradles 160,161 which can lockingly support items such as a screen-supporting spar 170 or lighting rig tube 180 respectively, or other items. One or more bubble levels 181,182 can be secured to the beam, booms, or other structures to facilitate leveling of the framework.

Figure 7:
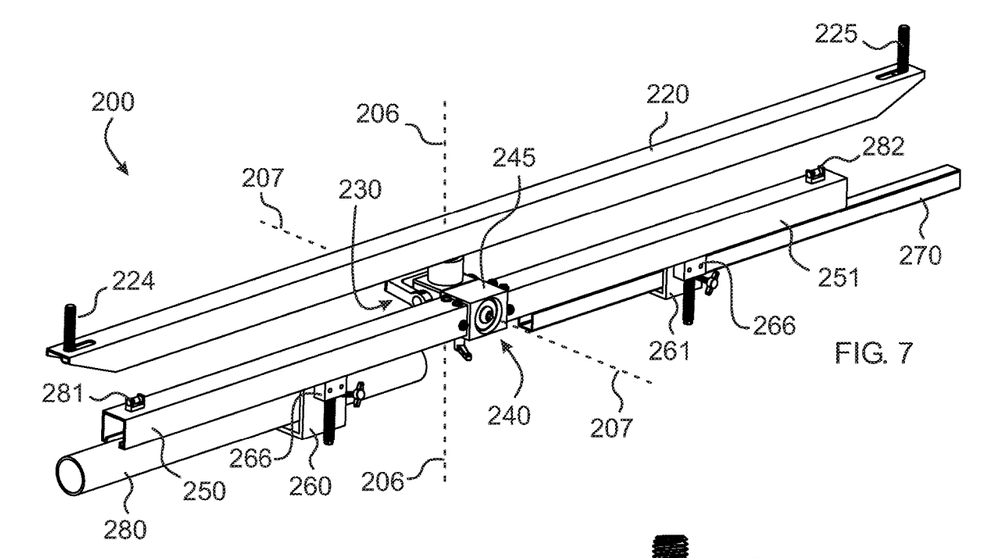
FIG. 7 is a diagrammatic perspective view of a framework according to an alternate exemplary embodiment having two mutually orthogonal pivot structures adjustably mounted to a beam.
Figure 8:
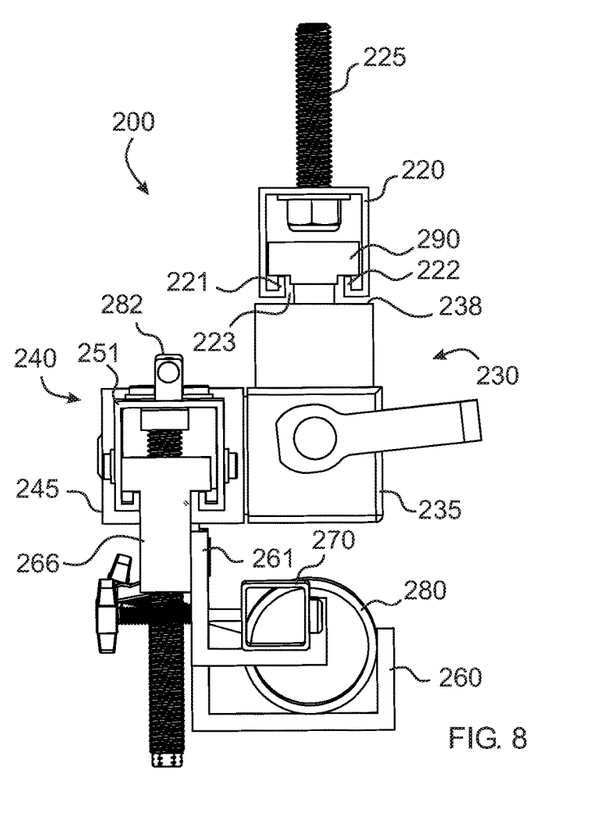
FIG. 8 is a diagrammatic partial cross-sectional side view of the framework of FIG. 7.
Figure 9:
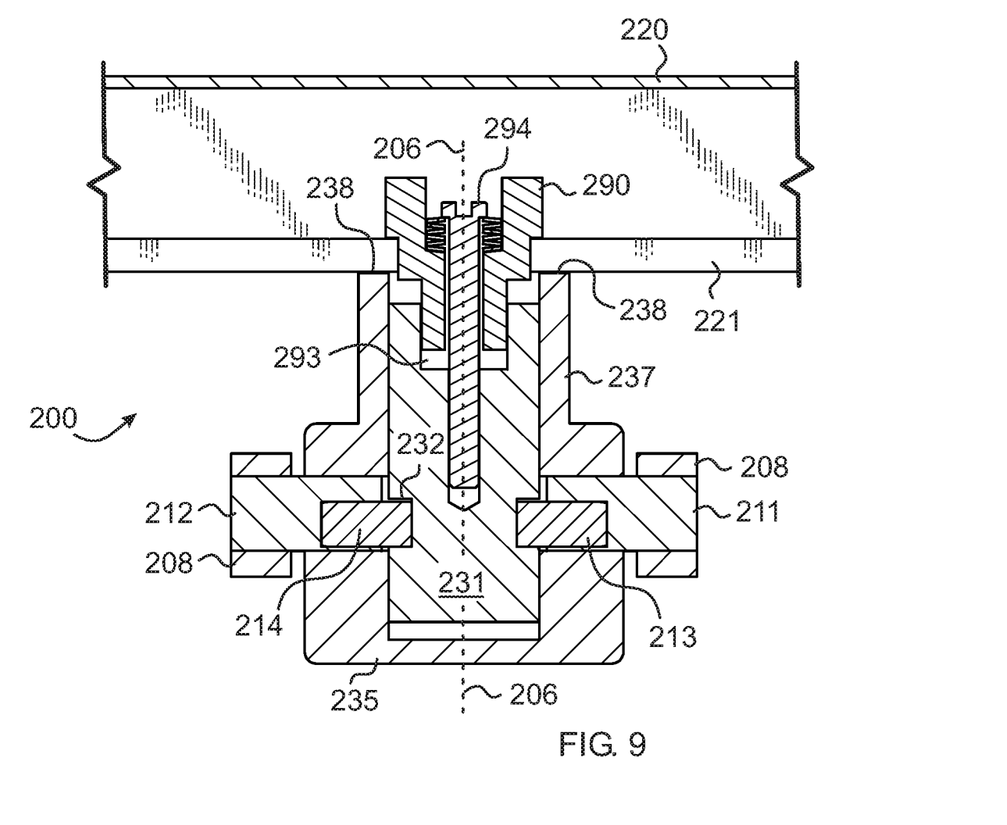
FIG. 9 is a diagrammatic cross-sectional front view of the framework of FIG. 7.

FIGS. 7-9 show an alternate embodiment of a hand-manipulable, track-engaging, swiveling, adjustable screen mounting framework 200 which provides an additional degree of freedom similar to the embodiment of FIG. 6, where a second substantially horizontal rotational axis 207 which is substantially orthogonal to a rotational axis 206 of an adjustable locking hanger and pivot structure 230 which locks to a tracked horizontal beam 220 through the use of a track engaging hanger 240 rather than through the non-adjustable block quadrangular block 39 of the embodiment of FIG. 3.

Referring now to FIGS. 7-8, the framework 200 can include a substantially horizontal beam 220 adjustably attached to the track by a pair of adjustable track-engaging hangers 224,225. The beam can support a first locking hanger and pivot structure 230 which in turn can support a second locking pivot structure 240. The housing 245 of the second pivot structure can support a pair of cantilevered booms 250,251 extending from opposite sides of the housing. Similar to the embodiment of FIG. 1, each boom can support a plurality of slidingly adjustable and lockable cradle hangers 266 which in turn can support differently sized cradles 260,261 which can lockingly support items such as a screen-supporting spar 270 or lighting rig tube 280 respectively, or other items. One or more bubble levels 281,282 can be secured to the beam, booms, or other structures to facilitate leveling of the framework. The locking hanger and pivot structure allows the booms to rotate with respect to the beam about the substantially vertical axis 206, while the second pivot structure 240 allows the booms to rotate with respect to the beam about the substantially horizontal axis 207.

Figure 10:
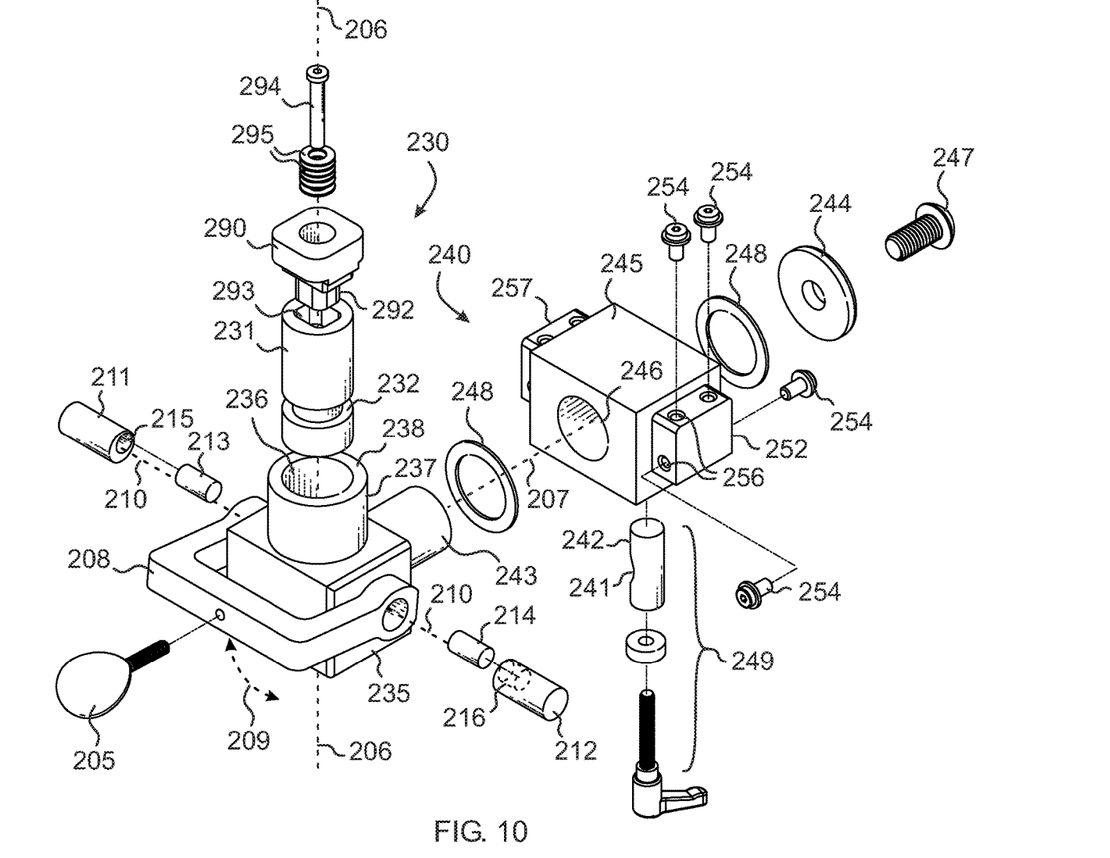
FIG. 10 is a diagrammatic exploded perspective view of the mutually orthogonal pivot structures of the framework of FIG. 7.

As shown in FIGS. 9-10, the first locking hanger and pivot structure 230 can include a housing 235 having a substantially vertical cylindrical well 236 which can be formed by a hollow tubular collar 237. The well forms a bearing which can be rotatively engaged by an axle 231 having a substantially vertical axis of rotation 206. The axial position of the axle can be adjusted by rotational movement 209 of a handle bracket 208 which straddles the housing and secures to a pair of camshafts 211,212 rotatively engaging opposite sides of the housing. The camshafts are coaxial to a camshaft axis 210 that can be substantially orthogonal to the spindle rotation axis 206. Each camshaft supports a substantially cylindrical cam pin 213,214 which can be pressed into an off-axis, substantially cylindrical pit 215,216 in the cam shaft. Once pressed the cam shaft and can pin form a cam unit. The cam pins can have an outer diameter which allows then to engage a circumferential groove 232 in the axle 231. It shall be understood that the angular movement of the handle bracket 208 will cause simultaneous rotation of both cam shafts 211,212, causing the cam pins 213,214 to force the axle 231 to move axially with respect to the collar 238 and housing 235. A grasping knob 205 facilitates manipulation of the handle bracket.

The axle 231 can attach to a generally T-shaped head 290 having a rectangularly dimensioned top 291 that can fit through the slot 223 of the beam 220 in a first orientation and cannot fit through the slot in a second orientation rotated 90 degrees from the first orientation. In this way the can bear against the inwardly projecting rails 221,222 of the beam to support the pivot structures. The upper edge of the collar 237 forms a ring-shaped surface 238 oriented to bear against the lower surfaces of the rails 221,222 of the beam 220 when the axle 231 is driven down into the well 236 by the action of the cams. In this way the head and collar pinch against the rails of the beam to lock the first locking hanger and pivot structure in place.

The head 290 can attach to the axle 231 by a keyed prominence 292 extending downwardly from the head to axially and intimately engage a correspondingly keyed receptacle 293 in the top of the axle. The correspondingly keyed surfaces of the prominence and receptacle prevent relative angular movement of the head with respect to the axle. A fastener 294 can adjustably fasten the head to the axle by penetrating through an oversized central bore of the head to threadingly engage a threaded hole in the top of the axle within the receptacle. A number of spring washers 295 can determine the force necessary move the head with respect to the axle. This allows for adjustment of how tightly the head and collar pinch the rails when the first locking hanger and pivot structure is placed into its locked position.

The second locking pivot structure 240 can include a second housing 245 having a substantially horizontal cylindrical bearing 246 rotatively and intimately engaged by a substantially cylindrical horizontal spindle 243 having a substantially horizontal axis of rotation 207. The spindle can fixedly attach to the housing 235 of the first pivot structure. The spindle can be held axially engaged in the bearing by an outer retaining disk 244 fastened by a fastener 247. A pair of low-friction washers 248 made from a material such as ultra high molecular weight (UHMW) plastic allow smooth yet rugged rotation of the second pivot structure housing 245 with respect to the first pivot structure housing 235 and the retaining disk. The spindle 243 can be angularly locked within the bearing 246 by a brake 249 including a chock jaw-type concavity 241 set into the cylindrical side surface of a barrel 242 slidingly engaged within an oversized cylindrical bore (not shown) oriented along an axis perpendicular to the spindle axis 207 and actuated axially by a hand-turned jackscrew engaging threaded hole in the barrel.

Similar to the previous embodiments, the second housing 245 of the second locking pivot structure 240 can support a pair of cantilevered booms 250,251 extending from substantially opposite sides of the housing in a substantially coaxial manner. Each boom 250,251 can have a structural C-channel shape to provide strength and rigidity while reducing weight and material, and to create and underslot 255 similar to the ceiling track 8 which can be adjustably engaged by track-engaging hangers as previously described. The boom 250 can connect to a tongue 252 protruding laterally from the second housing 245. The tongue can be shaped and dimensioned to intimately engage the open end of the boom. The boom can be secured upon the tongue using screw-type fasteners 254 engaging threaded holes 256 in the tongue. The other boom 251 can attach to a similar tongue 257 protruding from the opposite side of the housing.

It shall be understood that in some circumstances the head 290 can attach directly to the track 8 in the ceiling eliminating the need for the beam 220.

Figure 11:
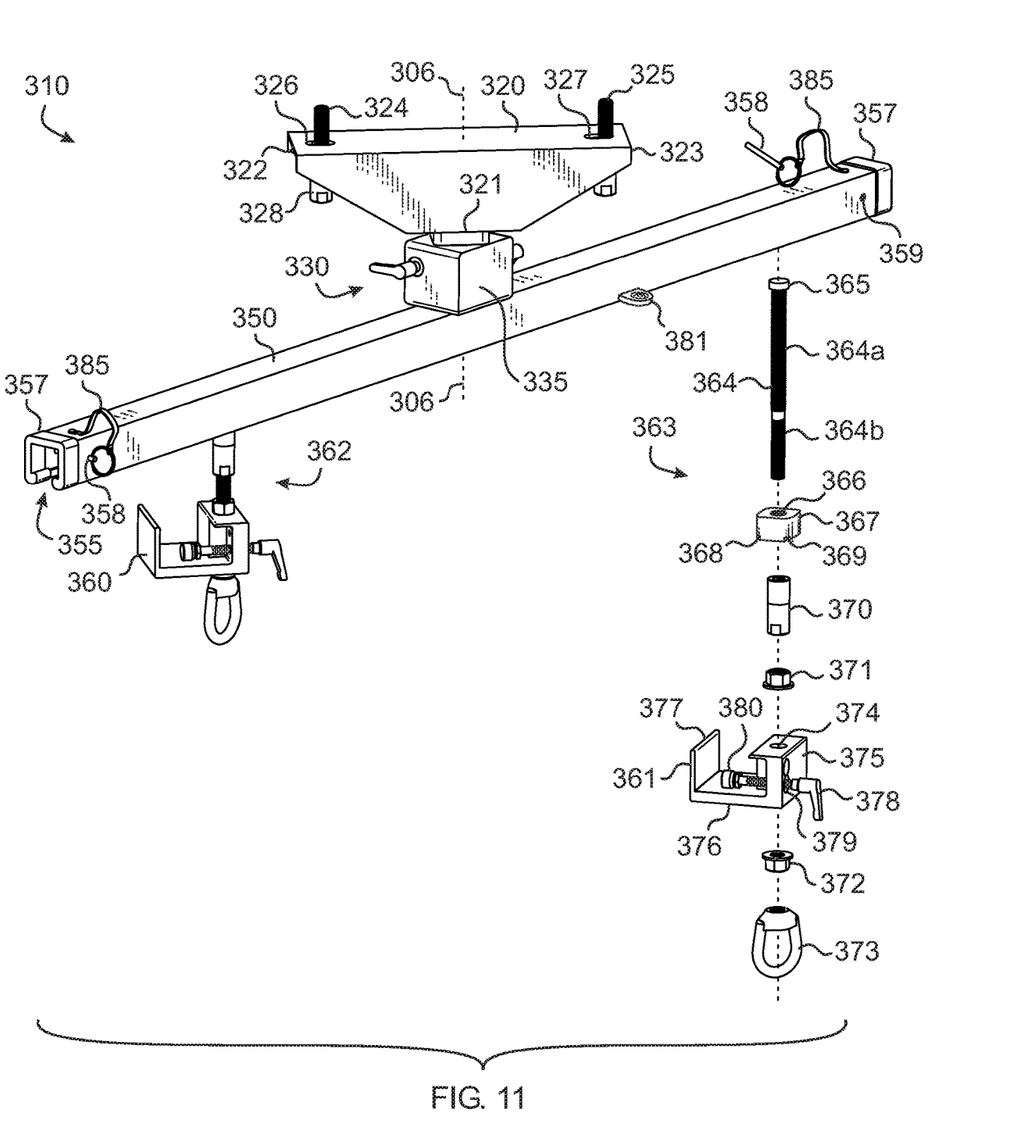
FIG. 11 is a diagrammatic, partially exploded perspective view of the framework according to an exemplary embodiment of the invention.
Figure 12:
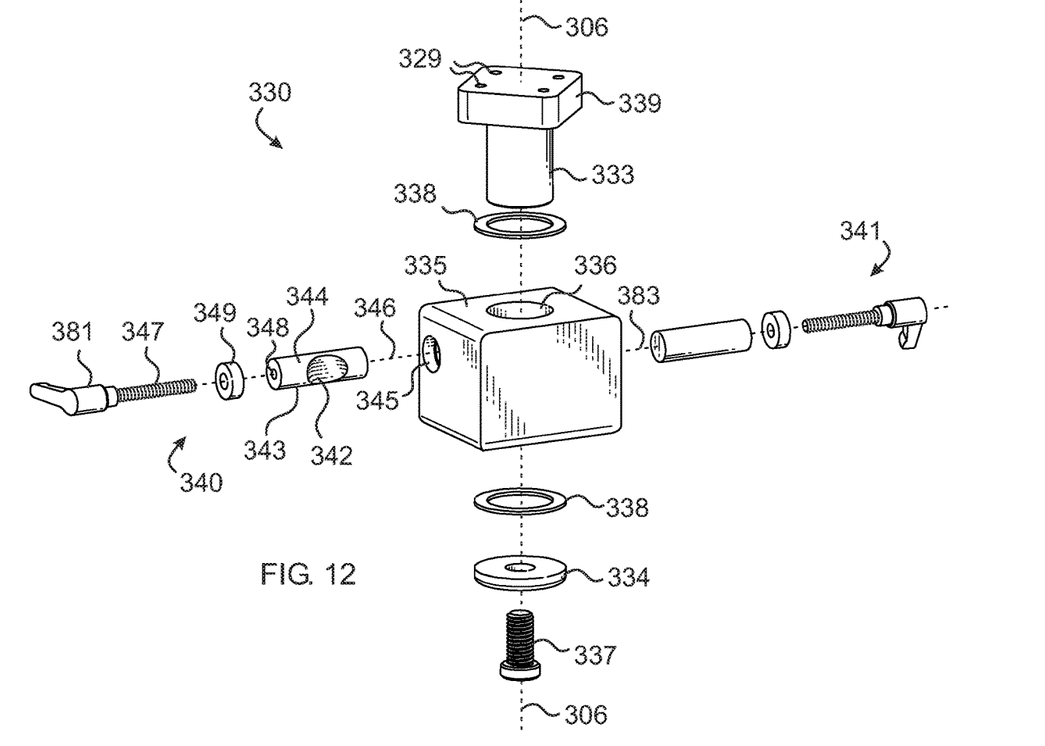
FIG. 12 is a diagrammatic exploded perspective view of the locking pivot structure of the framework of FIG. 11.
Figure 13:
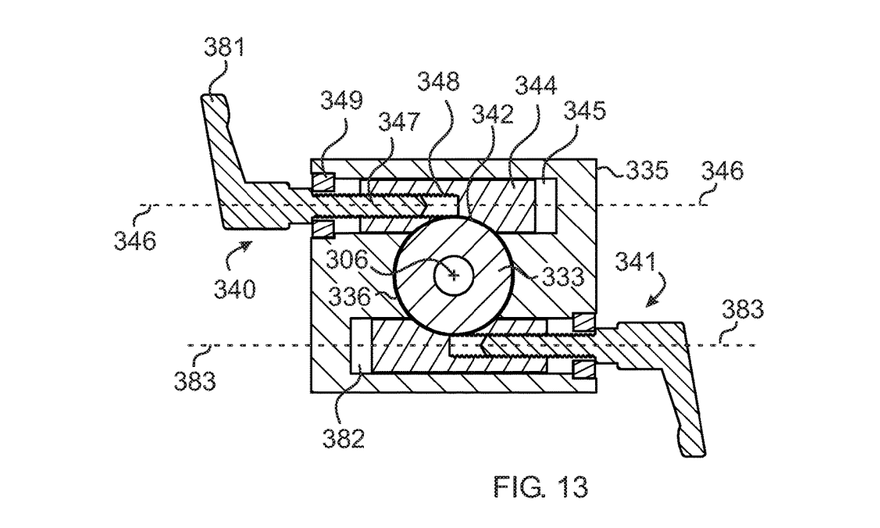
FIG. 13 is a diagrammatic cross-sectional top view of the locking pivot structure of FIG. 11.

Referring now to FIGS. 11-13 there is shown an alternate embodiment of a hand-manipulable, track-engaging, swiveling, adjustable screen mounting framework 310 according to an exemplary embodiment of the invention. Similar to the previous embodiments, the framework can adjustably support a movie screen or other item from an elongated track secured to the underside of a ceiling.

The framework 310 can include a substantially horizontal, rigid beam 320 adjustably attached to the track by a pair of adjustable track-engaging hangers 324, 325. The beam can support a locking pivot structure 330 which in turn can support a substantially horizontal boom 350 beneath the pivot structure. The boom can support cradles 360,361 which in turn can support the screen or other structures being suspended. The pivot structure allows the boom to rotate with respect to the beam about a rotation axis 306. The boom can have a C-shaped cross-section similar to the ceiling track thus providing a pair of inwardly extending substantially parallel rails separated by a slot similar to the slot of the ceiling track.

The beam 320 can have a pair of opposite ends 322,323. The beam can be made of steel or other durable, strong material. The beam can have a structural C-channel shape along the top to provide strength and rigidity while reducing weight and material and a medial undersurface 321. Similar to the previous embodiments, a pair of adjustable, track engaging hangers 324,325 engage longitudinal oval slots 326,327 near each end of the beam, adjustably securing the beam to the track. When unlocked, the hangers can slide longitudinally within their respective slots, and slide longitudinally within the track. Each hanger can be locked and unlocked by turning a knurled threaded nut 328 bearing against the underside of the beam below the oval slot.

Referring primarily to FIGS. 12 and 13, the locking pivot structure 330 which can mount to the medial cross-piece 321 on the undersurface of the beam 320. The locking pivot structure can include a housing 335 having a substantially vertical cylindrical bearing 336 rotatively engaged by a spindle 333 having a substantially vertical axis of rotation 306. The spindle can be held axially engaged in the bearing by a lower retaining disk 334 fastened by a fastener 337. A pair of low-friction washers 338 made from a material such as ultra high molecular weight (UHMW) plastic allow smooth yet rugged rotation of the spindle within the bearing. A substantially quadrangular block 339 formed into the top of the spindle allows it to secure intimately and ruggedly to the underside of the beam 320 by screw-type fasteners engaging threaded holes 329 in the block.

As shown in FIG. 11, the housing 335 of the locking pivot structure 330 can be fixedly attached to a medial portion of a substantially, horizontal, oblong rigid boom 350 using screw-type fasteners engaging threaded holes in the undersurface of the housing (not shown). The boom can have a structural C-channel shape to provide strength and rigidity while reducing weight and material, and to create an underslot 355 similar to the ceiling track. The underslot can be adjustably engaged by hangers as will be described below. Protective end caps 357 fit onto the free ends of the boom. A pair of disengagable stop pins 358 can be inserted through the boom near its ends to prevent the accidental sliding out of the hangers. Each stop pin can engage a pair of aligned holes 359 through the opposite vertical side walls of the boom. Each stop pin can be mounted to the boom by a flexible tether 385. A level 381, such as a bubble level, can mount upon the boom for conveniently providing ready feedback to technicians attempting to mount the framework in a level manner.

The boom 350 can support one or more cradles 360,361 which can attach to cradle hangers 362,363 which slidingly and lockably mount to the booms. Each cradle hanger 363 can include a threaded post 364 having an upper coarsely threaded section 364a engaging a threaded bore 367 in a T-block 366. The threaded post can have a swiveling upper capital 365 for bearing against the inner upper surface of the boom when the hanger is locked in place. The T-block engages through the slot of a boom and bears from above against the inwardly projecting rails of the boom by a pair of slotted arms 368,369. A knurled nut 370 can lock the T-block axially upon the post. The post can have a lower finely threaded section 364b engaging a substantially vertical mounting bore 374 on the cradle 361. Upper and lower nuts 371,372 axially straddle the cradle and lock it onto the post. A bottom eye nut 373 can cap the bottom tip of the post and provide support for a range of alternate hooking-type hangers or equipment fasteners common in the industry.

The cradle 361 can form a generally hook-shaped structure having a vertical plate portion 375 carrying the mounting bore 374. A horizontal plate portion 376 extends substantially orthogonally from the bottom of the vertical plate portion terminating in a distal upwardly projecting rim portion 377 in order to form a hook for engaging an oblong member such as the upper edge of a screen or a lighting rig tube for example resting in the cradle. A threaded lock pin 378 can engage one of a pair of vertically spaced apart threaded holes 379 in the vertical plate portion to lock the member in the cradle. The lock pin can have a swiveling capital 380 for bearing against any component being locked into the cradle. the inner upper surface of the boom when the hanger is locked in place.

As shown primarily in FIGS. 12-13, the angular position of the spindle 333 within the bearing 336 can be locked by a pair of brakes 340,341 located on opposite sides of the spindle. A first brake 340 can include a chock jaw-type concavity 342 set into the cylindrical side surface 343 of a barrel 344 slidingly engaged within an oversized cylindrical bore 345 oriented along an axis 346 substantially perpendicular to the spindle axis 306. A hand-turned jackscrew 347 engaging an axial threaded hole 348 in the barrel forms a mechanism for releasably driving the concavity against the spindle. A brake washer 349 mounted within the opening to the cylindrical bore 345 provides a bearing surface against which the jackscrew can provide axial force when turned using a handle 381. The concavity can be substantially cylindrical having a radius of curvature slightly greater than the radius of the spindle so that the spindle can rotate freely within the bearing 336 when the first brake is in an unlocked position. Tightening the jackscrew causes the far side of the concavity to press against the spindle forcing the concavity to seat tightly against the spindle thereby discouraging the spindle from rotating due to friction, thus locking the spindle with respect to the housing.

A second brake 341 can be identical to the first brake 340 and be located to bear against the spindle 333 on a side opposite from the first brake. The second brake therefore can engage its own dedicated oversized cylindrical bore 382 oriented along an axis 383 substantially perpendicular to the spindle axis 306 and substantially parallel to the axis 346 of the first brake. The bore of the second brake extends from an opposite side of the housing 335 so as to avoid interfering with the turning of the handle 381 during locking and unlocking of the first brake. In this way both brakes symmetrically engage the spindle on opposite sides thus forming a clamp sandwiching the spindle between the two brakes, providing greater locking power and resistance to torque derived from the leverage provided by forces acting on the elongated boom 350. In this orientation the axes of both brakes lie within a plane substantially perpendicular to the spindle axis. Further, both axes can be substantially parallel. Also, in this way both brakes can be separately actuatable.

It is generally counterintuitive to place a secondary track, provided by the boom, below an existing ceiling track since that will make the supporting framework more visible and reduce vertical space. However, by eliminating floor-mounted stands, the disclosed framework provides a reduction in clutter in the overall venue, and a significantly greater functionality to ceiling track mounting systems.

Figure 14:
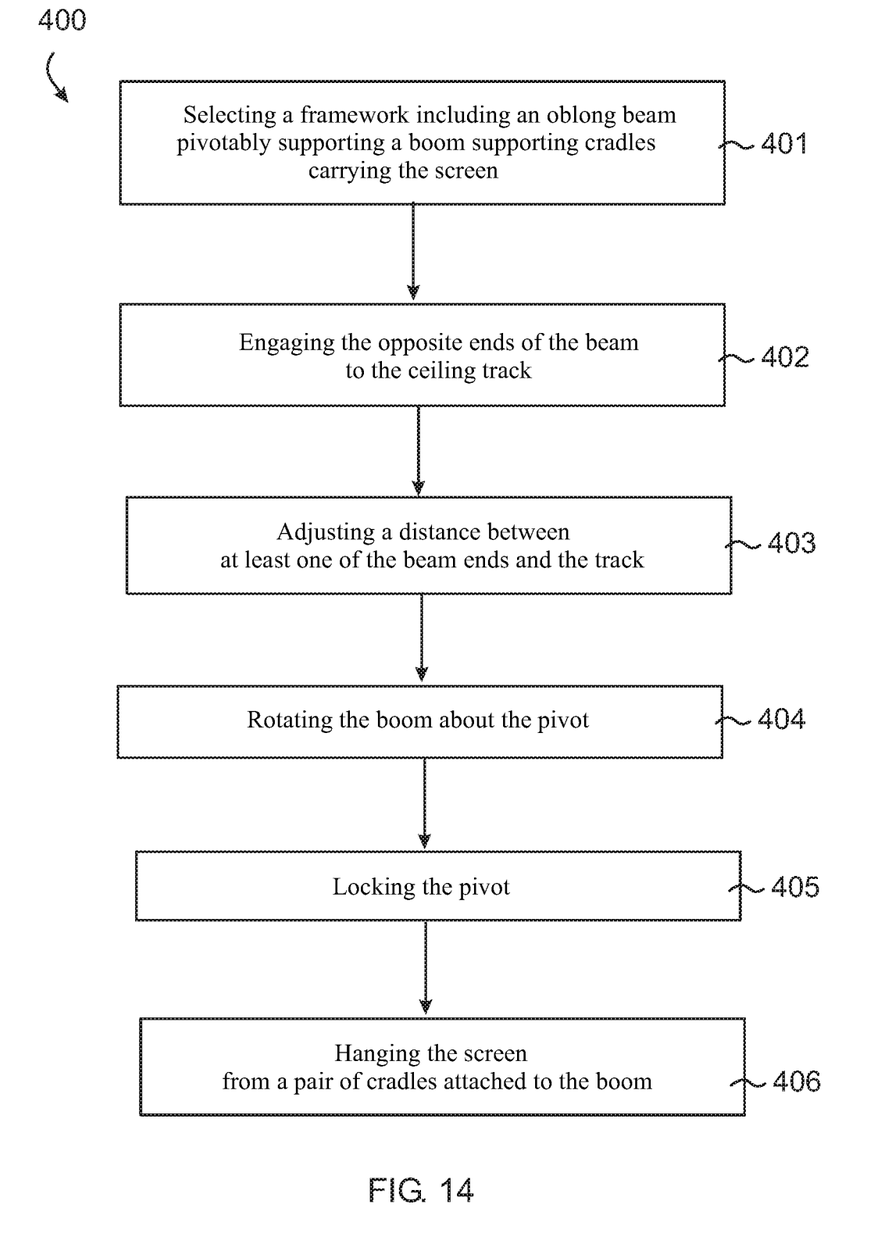
FIG. 14 is a diagrammatic flow chart diagram of a method of mounting an adjustable framework to a ceiling track.

FIG. 14 shows the primary steps of a method 400 for suspending a screen from a ceiling track. The steps include selecting a framework which comprises an oblong beam having opposite ends, a pivot secured to a middle part of said beam, a substantially horizontal boom supported by the pivot, and a pair of cradles secured to the boom 401; engaging the opposite ends of the beam to the ceiling track 402; adjusting a distance between at least one of the beam ends and the track, thereby leveling the beam 403; rotating the boom about the pivot, thereby adjusting an angle of the boom with respect to said track 404; locking the pivot, thereby releasably preventing further angular movement of boom with respect to the track 405; and, hanging the screen from a pair of cradles attached to the boom 406.

While the preferred embodiments of the invention have been described, modifications can be made and other embodiments may be devised without departing from the spirit of the invention and the scope of the appended claims.

What is claimed is:

1. A device which comprises:
   a ceiling track;
   an adjustable framework which comprises:
      a beam including a first end and a second end;
      at least one hanger supporting said beam to said ceiling track;
   said at least one hanger being slidingly longitudinally adjustable within and along said ceiling track;
      a pivot structure secured to said beam, said pivot structure comprises:
         a housing comprising a bearing;
         a spindle rotatively mounted to said housing about a first axis of rotation;
         at least one brake releasably locking the angular position of said spindle in said housing;
      a boom secured to said housing; and,
      at least one cradle secured to said boom.

2. The device of claim 1, wherein said at least one hanger is adjustable along a vertical direction.

3. The device of claim 2, wherein said first axis of rotation is substantially parallel to said vertical direction.

4. The device of claim 2, wherein said at least one hanger comprises:
- a first hanger located proximate said first end for suspending said beam from said track; and,
- a second hanger located proximate said second end for suspending said beam from said track.

5. The device of claim 1, wherein said at least one cradle comprises:
- a first cradle secured to said boom; and,
- a second cradle secured to said boom.

6. The device claim 1, wherein said at least one cradle comprises a hook for engaging an oblong member perpendicular to said first axis of rotation.

7. The device of claim 6, wherein said at least one cradle comprises a cradle lock for releasably securing said oblong member within said hook.

8. The device of claim 1, which further comprises: said bearing having a substantially cylindrical sidewall; wherein said at least one brake comprises:
- a first concavity contacting said spindle to discourage rotation of said spindle when said first one of said brakes is in a first locked position; and,
- a a jackscrew releasably driving the first concavity against the spindle.

9. The device of claim 1, which further comprises: said boom have a substantially C-shaped cross-section oriented to form an underslot engaged by said at least one cradle.

10. The device of claim 9, which further comprises:
a stop-pin releasably engaging said boom into said substantially C-shaped cross-section blocking lateral movement of said at least one cradle past said stop-pin.

11. The device of claim 10, wherein said stop-pin engages a pair of aligned holes through opposite vertical side walls of said boom.

* * * * *